Nov. 13, 1962 W. A. LEDWITH 3,063,240
BOOSTER MEANS FOR A RAMJET-ROCKET DEVICE
Filed Aug. 22, 1960
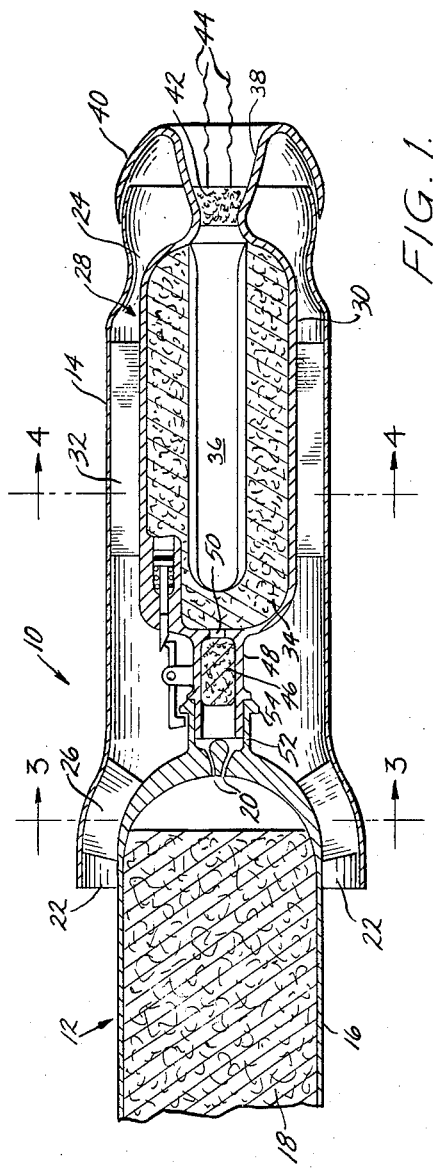
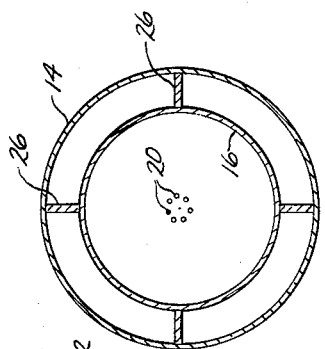
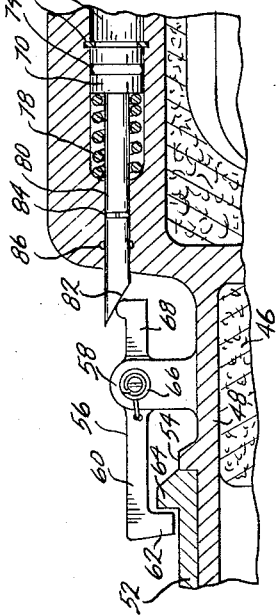
INVENTOR.
WALTER A. LEDWITH
BY
Teller & McCormick
ATTORNEYS

United States Patent Office 3,063,240
Patented Nov. 13, 1962

3,063,240
BOOSTER MEANS FOR A RAMJET-ROCKET DEVICE
Walter A. Ledwith, Glastonbury, Conn., assignor to United Aircraft Corporation, East Hartford, Conn., a corporation of Delaware
Filed Aug. 22, 1960, Ser. No. 50,924
12 Claims. (Cl. 60—35.6)

This invention relates to a ramjet-rocket device, and deals more particularly with a disposable booster means for bringing such a device up to ramjet operating velocities before the device is ignited.

A ramjet-rocket device of the type with which this invention is concerned comprises a main rocket cooperating with a ramjet duct. The rocket includes a case, a fuel-rich propellant charge within the case and a nozzle which directs fuel-rich gases produced as a result of the combustion of the propellant into the ramjet duct. The ramjet duct in turn extends rearwardly from the rocket nozzle and has a ram air inlet at the forward end and an exhaust opening at the rear end. As the fuel-rich gases from the rocket nozzle enter the ramjet duct they are mixed with air from the ram air inlet and burned within the duct to produce a ramjet propulsive effect as the expanded gases resulting from the combustion pass through the duct. Thrust is thus imposed on the device both as a result of the rocket reaction forces and as a result of the ramjet effect; but, as with any device operating on the ramjet principle, the rocket and ramjet duct must be brought up to a certain velocity before they will operate to produce the ramjet effect.

The general object of this invention is to provide a disposable booster means for bringing a ramjet-rocket device as aforesaid up to a ramjet operating velocity before the fuel-rich propellant of the main rocket is ignited, together with means for disposing of the booster means after its purpose is accomplished.

A further object of this invention is to provide a booster means for a ramjet-rocket device, which booster means is conveniently located within the ramjet duct during its period of operation and which, after its propellant charge is burned out, is ejectable from the duct to free the latter for ramjet operation.

A still further object of this invention is to provide a disposable booster rocket for a ramjet-rocket device which booster rocket is adapted to fit within the ramjet duct and includes means for automatically igniting the fuel-rich propellant of the main rocket and for ejecting itself from the ramjet duct when its own propellant charge is substantially burned out.

Other objects and advantages of the invention will be apparent from the drawing and from the following description.

The drawing shows a preferred embodiment of the invention and such embodiment will be described, but it will be understood that various changes may be made from the construction disclosed, and the drawing and description are not to be construed as defining or limiting the scope of the invention, the claims forming a part of this specification being relied upon for that purpose.

Of the drawing:

FIG. 1 is a longitudinal sectional view taken through a ramjet-rocket device and booster means embodying this invention, the view showing only the rear portion of the main rocket, FIG. 2 is an enlarged fragmentary view showing the piston actuated latch means of the FIG. 1 device, FIG. 3 is a transverse sectional view taken on the line 3—3 of FIG. 1, and FIG. 4 is a transverse sectional view taken on the line 4—4 of FIG. 1.

Referring now to FIG. 1 of the drawing, the reference numeral 10 indicates generally a ramjet-rocket device embodying this invention. The device 10 includes a main rocket 12 having fastened to its rear end a ramjet duct 14 which extends axially rearwardly from the rocket. The main rocket 12 includes a case or shell 16 containing a solid fuel-rich propellant charge 18, which when burned produces fuel-rich gases that are discharged from the case 16 through a nozzle means at the rear end of the case. It is contemplated that various types of nozzle means might be employed with the main rocket case 16, but in the present instance this means is shown to comprise a plurality of nozzle orifices 20, 20 arranged in an annular series as shown in FIG. 3. Before it is ignited the fuel-rich propellant charge 18 almost completely fills the case 16 and extends rearwardly to a point close to the nozzle orifices 20, 20.

The fuel-rich gases produced by the combustion of the main rocket propellant charge 18 pass through the nozzle orifices 20, 20 and enter the ramjet duct 14 where they are mixed with air flowing into the duct from a ram air inlet 22 located at the forward end of the duct. Combustion then takes place between the fuel-rich gases and the air, and as a result expanded gases are produced which are discharged through a nozzle-shaped exhaust opening 24 at the rear end of the duct to produce the ramjet effect. The ramjet duct 14 is preferably substantially circular in cross section at all points along its length and is connected to the rear end of the main rocket case 16 by suitable means such as a plurality of radially extending supporting vanes 26, 26 arranged in an annular series between the rocket case 16 and the duct 14 at the forward or inlet end of the duct.

As mentioned previously, in operation the ramjet-rocket device 10 is driven both by thrust produced as a result of the reaction forces imposed on the main rocket 12 and by thrust produced as a result of the ramjet effect developed in the ramjet duct 14, but before the ramjet effect can be experienced the device must be brought up to a certain operating velocity. To achieve this operating velocity the present invention contemplates the use of a booster means which is effective to first drive the ramjet device to the required velocity and to then automatically ignite the main rocket propellant charge 18 and to remove itself from the device. As shown in FIG. 1, this booster means includes a booster rocket 28 comprising a hollow case 30 disposed within the ramjet duct 14. The booster case 30 is radially supported within the duct 14 by suitable means such as a plurality of radial vanes 32, 32 arranged in an annular series between the case 30 and the duct 14. The outer ends of the vanes 32, 32 are connected with the case 14, while the inner ends thereof merely engage the outer surface of the booster case 30 so that the latter is slidably supported for axial movement relative to the duct 14. The outer diameter of the booster case 30 is of such a size that the booster rocket may pass axially through the exhaust opening 24 of the ramjet duct after its purpose is fulfilled. In order to completely free the interior of the ramjet duct for ramjet operation after the booster rocket is disposed of, the support vanes 32, 32 are preferably made of a material such as plastic which will burn or melt when exposed to the combustion process subsequently carried out within the duct.

The booster rocket case 30 contains a solid propellant charge 34 which, as shown in FIG. 4, is preferably formed with a star-shaped axial opening 36, according to conventional practice, to provide a substantially constant surface area during its combustion. Gases produced as a result of the combustion of the propellant 34 pass rearwardly out of the booster case 30 through a nozzle portion 38 formed integral with the case 30. As shown in FIG. 1, the nozzle portion 38 at its outer end may be bent reversibly to form a generally forwardly extending flange portion 40 which engages the outer surface of the ramjet duct 14 adjacent the rear end thereof. This arrangement provides some additional support for the booster rocket. Ignition of the booster rocket 30 is preferably accomplished by means of a conventional igniter plug 42 positioned in the booster nozzle portion 38 and having ignition wires 44, 44 adapted for connection to a suitable firing mechanism, not shown.

In accordance with the present invention, the booster rocket, after its propellant charge is substantially burned out, is ejected from the ramjet duct 14 by means of an explosive powder charge which serves to drive the empty rocket case 30 rearwardly through the duct 14, and which powder charge also serves to throw burning or hot material through the nozzle orifices 20, 20 to ignite the fuel-rich propellant charge 18 within the main rocket case 16. In the presently illustrated device such a powder charge is shown indicated at 46 and is contained within a generally tubular housing 48 located on the forward end of the booster case 30. The housing 48 is connected with the booster case 30 and is preferably formed integrally therewith. It also has, at least at its forward portion, a generally uniform cross section which is preferably cylindrical. The forward end of the housing 48 is open and faces, in closely spaced relationship, the nozzle orifices 20, 20 of the main rocket case 16. At its rear end the housing 48 is provided with a restricted ignition opening 50 which extends through the booster case 30 and provides communication between the powder charge 46 and the booster propellant charge 34. Thus, when the combustion of the booster propellant charge 34 reaches the region adjacent the ignition opening 50 the powder charge 46 in the housing 48 will be ignited by combustion products passing through the ignition opening 50. The arrangement of the propellant charge 34 in the booster case 30 is, however, such that the combustion process within the booster case will not reach the region of the ignition opening 50 until the propellant charge 34 is substantially burned out, and as a consequence the powder charge 46 is not ignited until the booster case 30 is substantially empty.

The booster rocket 28 is connected to the main rocket case 16 by means including an axially extending flange portion 52 which surrounds the nozzle orifices 20, 20, as shown in FIG. 1, and extends into axially overlapped or telescoped relation with thet forward portion of the housing 48 on the booster case 30. The flange portion 52 also completely surrounds the forward portion of the housing 48 and at its rear end face abuts against a radial flange 54 formed on the outer surface of the housing 48. During the operation of the booster rocket 28 the thrust developed thereby is imparted to the main rocket case 16 through these coengaging elements. Also, when the powder charge 46 is ignited the telescoped housing 48 and the flange portion 52 serve to help direct burning or hot material from the powder charge through the nozzle orifices 20, 20 to ignite the main rocket propellant charge 18, and also serve to confine the high pressure gases produced by the combustion of the powder charge so as to produce a rearwardly acting force on the booster case 30 for the purpose of driving or ejecting it rearwardly through the ramjet duct.

Associated with the two telescoped parts is a latch or restraining means which normally serves to hold the two parts in axially fixed relationship so as to retain the booster case 30 axially in place within the ramjet duct 14, but which means is operated after the booster propellant charge is ignited to unlatch the two telescoped parts, thereby permitting the booster case 30 to move rearwardly with respect to the main rocket 16 and the ramjet duct 14 when the powder charge is ignited. It is contemplated that this latch means may take various forms without departing from the invention. In FIG. 1 a suitable latch means is shown to comprise a latch member 56 which is pivotally mounted on a support arm 58 formed on the outer surface of the powder charge housing 48. The latch member 56 includes a forwardly extending portion 60 having a finger 62, which finger latchably cooperates with a radially outwardly extending flange 64 formed on the rear portion of the flange 52. The latch portion 60 is normally biased into the latching position shown in FIG. 2 by means of a torsion spring 66 acting between the arm 58 and the latch member 56. The latch member 56 also includes a rearwardly extending portion 68 which, as viewed in FIG. 2, is movable downwardly or in the clockwise sense to raise the latch finger 62 to an unlatched position with respect to the flange 64. Unlatching movement of the rearwardly extending latch portion 68 is controlled by a piston actuated means responsive to the pressure generated by the combustion of the propellant charge within the booster case 30. As best shown in FIG. 2, this piston actuated means comprises a piston 70 disposed within a cylinder 72, the cylinder being formed in the booster rocket casing 30 and having its rear end in open communication with the interior thereof. The piston 70 carries a sealing ring 74 which bears against the surface of the cylinder 72. Rearward movement of the piston 70 is limited by engagement with a snap ring 76 positioned in the cylinder 72, and the piston is normally held in engagement with the snap ring by means of a coil compression spring 78. Attached to the piston 70 is a rod 80 which extends forwardly through the booster case 30 and has an inclined face 82 on its forward end which engages the rearwardly extending latch portion 68.

From FIG. 2, it will be seen that forward movement of the rod 80 as a result of gas pressure acting on the rear face of the piston 70 will cause the inclined surface 82 to drive the latch portion 68 downwardly to raise the latch finger 62 to an unlatched position. After the piston 70 and rod 80 are moved to a forward unlatching position by means of the gas pressure they are held in this position by means of a snap ring 84 carried by the rod 80. The snap ring 84 is of a springlike character and is normally held in a radially inwardly deformed position on the rod 80. When the rod 80 is moved to the unlatching position, however, the ring 84 will snap outwardly into a cooperating groove 86 in the booster case wall to hold the rod in the unlatched position despite the loss of gas pressure within the booster case 30. The piston cylinder 72 is so located within the booster case 30, and the propellant charge 34 so arranged, that after the ignition of the propellant charge, gases generated by the combustion process will reach and act on the piston 70 to operate the latch means before the combustion process reaches the region of the ignition opening 50 and ignites the powder charge 46. Thus, by the time the powder charge is ignited the housing 48 and the flange 52 are freed by the latch means for axial sliding movement.

Having now described the construction of the illus- trated device, its operation may be briefly summarized as follows. The booster rocket propellant 34 is first ignited by the operation of the igniter plug 42. The burning of the propellant 34 then produces high pressure gases which pass rearwardly from the booster rocket case 30 through the nozzle 38 and produce reaction forces which drive the booster rocket forwardly to impart thrust to the ramjet-rocket device, thereby driving the same forwardly and bringing it up to a proper ramjet operating velocity. As the combustion process continues in the booster case 30 some of the high pressure gases generally eventually reach the piston cylinder 72 and drive the piston 70 forwardly to move the latch finger 62 to an unlatched position with respect to the radial flange 64. As the device approaches a ramjet operating velocity the propellant charge within the booster case 30 approaches a state of depletion, and as this occurs the combustion process reaches the region adjacent the ignition opening 50. The combustion process then passes through the ignition opening 50 and ignites the powder charge 46. The powder charge 46 then burns in an explosive manner and produces high pressure gases which drive the empty or substantially empty booster case 30 rearwardly through the ramjet duct exhaust opening 24 to dispose of the same and to free the interior of the ramjet duct 14 for subsequent operation on the ramjet principle. Also, as the powder charge 46 is ignited some of the hot or burning products produced during its combustion will be thrown forwardly through the nozzle orifices 20, 20 into the ramjet case 16 and into contact with the fuel-rich propellant charge 18 to cause the ignition of the latter. Combustion then takes place within the main rocket case 16 producing thrust on the rocket and also producing fuel-rich gases which pass rearwardly through the nozzle orifices 20, 20 and into the ramjet duct 14. In the duct these fuel-rich gases are first mixed with air entering from the ram inlet 22 and are then burned to produce expanded gases which pass rearwardly through the exhaust opening 24 and develop a ramjet effect. At the start of the ramjet operation the combustion process carried out within the ramjet duct 14 will create sufficient heat to melt or burn the plastic support vanes 32, 32 and thereby completely free the interior of the ramjet duct for proper ramjet operation.

The invention claimed is:

1. The combination with a ramjet-rocket device having a main rocket means and a ramjet duct surrounding the discharge end of said main rocket means and extending rearwardly therefrom of: a booster rocket positioned within said ramjet duct and axially slidable relative thereto for discharge through the exhaust opening thereof, means releasably holding said booster rocket against axial movement in a rearward direction relative to said duct, and means operative during the combustion process in said booster rocket for releasing said holding means prior to the completion of said combustion process.

2. The combination with a ramjet-rocket device having a main rocket means and a ramjet duct surrounding the discharge end of said main rocket means and extending rearwardly therefrom of: a booster rocket positioned within said ramjet duct and axially slidable relative thereto for discharge through the exhaust opening thereof, means releasably holding said booster rocket against axial movement in a rearward direction relative to said duct, and means responsive to the gas pressure generated by the combustion process in said booster rocket for releasing said holding means prior to the completion of said combustion process.

3. The combination with a ramjet-rocket device having a main rocket means and a ramjet duct in which fuel-rich exhaust gases from said main rocket means are mixed with air and burned to produce a ramjet propulsive effect of: a booster rocket adapted to bring said main rocket means and said ramjet duct up to ramjet operating velocities before said main rocket means is ignited, said booster rocket being disposed within said ramjet duct and including a case which is slidable axially of said ramjet duct and is dimensioned to pass axially through the exhaust opening of said ramjet duct, restraining means serving to releasably hold said booster rocket against axial rearward movement relative to said ramjet duct before ignition of said booster rocket, the said restraining means being effective after ignition of said booster rocket to release said booster rocket for rearword sliding movement relative to said ramjet duct so that the booster rocket, after its propellant is substantially burned, may be disposed of by being moved axially through the exhaust opening of said ramjet duct, and means for igniting said main rocket means after said booster rocket is substantially burned out but before said booster rocket is removed from said ramjet duct.

4. The combination with a ramjet-rocket device having a main rocket means and a ramjet duct in which fuel-rich exhaust gases from said main rocket means are mixed with air and burned to produce a ramjet propulsive effect of: a booster rocket adapted to bring said main rocket means and said ramjet duct up to ramjet operating velocities before said main rocket means is ignited, said booster rocket being disposed within said ramjet duct and including a case which is slidable axially of said ramjet duct and is dimensioned to pass through the exhaust opening of said ramjet duct, restraining means serving to hold said booster rocket against axial movement relative to said ramjet duct before ignition of said booster rocket, the said restraining means being effective after ignition of said booster rocket to release said booster rocket for sliding movement relative to said ramjet duct, and a powder charge located between said booster rocket case and said main rocket means which powder charge is arranged to be ignited by the propellant of said booster rocket after said propellant is substantially burned out and which powder charge upon ignition is effective to eject said booster rocket case by driving the same rearwardly through the exhaust opening of said ramjet duct.

5. The combination with a ramjet-rocket device having a main rocket means and a ramjet duct in which fuel-rich exhaust gases from said main rocket means are mixed with air and burned to produce a ramjet propulsive effect of: a booster rocket adapted to bring said main rocket means and said ramjet duct up to ramjet operating velocities before said main rocket means is ignited, said booster rocket being disposed within said ramjet duct and including a case which is slidable axially of said ramjet duct and is dimensioned to pass through the exhaust opening of said ramjet duct, and a powder charge located between said booster rocket case and said main rocket means which powder charge is arranged to be ignited by the propellant of said booster rocket after said propellant is substantially burned out and which power charge upon ignition is effective to eject said booster rocket case by driving the same rearwardly through the exhaust opening of said ramjet duct, said powder charge further being located adjacent the exhaust opening of said main rocket means so that upon ignition of said powder charge hot or burning material will be driven through said exhaust opening to ignite the propellant of said main rocket means.

6. The combination with a ramjet-rocket device having a main rocket means and a ramjet duct in which fuel-rich exhaust gases from said main rocket means are mixed with air and burned to produce a ramjet propulsive effect of: a booster rocket adapted to bring said main rocket means and said ramjet duct up to ramjet operating velocities before said main rocket means is ignited, said booster rocket being disposed within said ramjet duct and including a case dimensioned to pass through the exhaust opening of said ramjet duct, means for igniting said main rocket means and for ejecting said booster rocket rearwardly through the exhaust opening of said ramjet duct when said booster rocket is substantially burned out, and structural means between said booster case and said ramjet duct for radially supporting said booster case within said ramjet duct and for guiding said booster case axially of said ramjet duct during its ejection therefrom, said structural means being connected to said ramjet duct and being made of a material which will burn or melt when exposed to the combustion process subsequently carried out in said ramjet duct.

7. A ramjet-rocket device comprising in combination, a main rocket case having a cavity containing a fuel-rich propellant charge and having a nozzle means at its rear end for the discharge of fuel-rich gases produced by the combustion of the propellant charge, a ramjet duct connected with said main rocket case and extending rearwardly therefrom and having an exhaust opening in its rear end, a booster rocket case disposed within said ramjet duct and supported for sliding movement axially thereof for expulsion through said exhaust opening, said booster rocket case having a cavity containing a booster propellant charge and a nozzle at its rear end for the discharge of gases produced by the combustion of said booster propellant, and a housing located on the forward end of said booster rocket case and containing a powder charge, said housing having an open front end facing said main rocket nozzle means and having a restricted ignition opening at its rear end extending through said booster rocket case to provide communication between said powder charge and said booster propellant so that as the combustion of said booster propellant reaches the region of said ignition opening said powder charge will be ignited, said powder charge upon ignition serving to drive said booster rocket rearwardly of said ramjet duct for expulsion through said exhaust opening and to throw burning or hot material through said main rocket nozzle means to ignite said fuel-rich propellant charge.

8. The combination as defined in claim 7 further characterized by latch means which are normally effective to hold said booster rocket axially in place within said ramjet duct and which are rendered ineffective after said booster rocket propellant is ignited.

9. The combination as defined in claim 7 further characterized by said powder charge housing being tubular in form and having a generally uniform cross section, and an axially extending tubular portion on said main rocket case which tubular portion surrounds said main rocket nozzle means and is arranged in telescoped relation with said powder charge housing.

10. A ramjet-rocket device comprising in combination, a main rocket case having a cavity containing a fuel-rich propellant charge and a nozzle means at its rear end for the discharge of fuel-rich gases produced by the combustion of the propellant charge, a ramjet duct connected with said main rocket case and extending rearwardly therefrom, said ramjet duct having an air inlet at its forward end and an exhaust opening at its rear end and being so positioned with respect to said main rocket case that the fuel-rich gases discharged by said nozzle means enter said duct for combustion with air from said inlet means to produce a ramjet effect, a booster rocket case disposed within said ramjet duct and containing a propellant, structural means between said booster rocket case and said duct serving to radially support said booster rocket case within said ramjet duct and to guide the same for axial movement relative to said ramjet duct, said booster rocket case being of such a size as to be capable of passing axially through the said exhaust opening of said ramjet duct for the purpose of disposal after its propellant is burned out, a hollow and axially extending housing located at the forward end of said booster rocket case and containing a powder charge, an axially rearwardly extending hollow portion on said main rocket casing which hollow portion surrounds the said nozzle means of said main rocket case and slidably axially overlaps the said hollow housing on said booster rocket case, said hollow housing having an open forward end and having a restricted ignition opening at its rear end extending through the booster rocket case and providing communication between the powder charge in said housing and the booster propellant so that as the combustion of the booster propellant reaches the region adjacent said ignition opening said powder charge will be ignited, said powder charge when ignited serving to eject said booster rocket case rearwardly through said ramjet duct exhaust opening for disposal thereof and also serving to cause the ignition of said main rocket propellant by blowing hot or burning material through said nozzle means, means releasably connecting said hollow booster case housing to said hollow main case portion to hold said booster case axially in place within said ramjet duct, and means responsive to the gas pressure generated by the combustion of said booster propellant for releasing said last-mentioned connecting means to permit the free ejection of said booster case.

11. A ramjet-rocket device comprising in combination, a main rocket case having a cavity containing a fuel-rich propellant charge and a nozzle means at its rear end for the discharge of fuel-rich gases produced by the combustion of the propellant charge, a ramjet duct connected with said main rocket case and extending rearwardly therefrom, said ramjet duct having an air inlet at its forward end and an exhaust opening at its rear end and being so positioned with respect to said main rocket case that the fuel-rich gases discharged by said nozzle means enter said duct for combustion with air from said inlet means to produce a ramjet effect, a booster rocket case disposed within said ramjet duct, said booster rocket case containing a propellant charge and having a nozzle at its rear end located near the exhaust opening of said ramjet duct, a plurality of vanes arranged in an annular series between said booster rocket case and said ramjet duct and serving to radially support said booster rocket case within said ramjet duct and to guide the same for axial movement relative to said ramjet duct, said booster rocket case being of such a size as to be capable of passing axially through the said exhaust opening of said ramjet duct for the purpose of disposal after its propellant is burned out, said vanes being made of a material which will burn or melt when exposed to the combustion of the fuel-rich gases subsequently carried out in said ramjet duct, a hollow and axially extending housing on the forward end of said booster rocket case and containing a powder charge, an axially rearwardly extending hollow portion on said main rocket casing which hollow portion surrounds the said nozzle means of said main rocket case and slidably axially overlaps the said hollow housing on said booster rocket case, said hollow housing on said booster rocket case having an open forward end and having a restricted ignition opening at its rear end extending through the booster rocket case and providing communication between the powder charge in said housing and the booster propellant so that as the combustion of the booster propellant reaches the region adjacent said ignition opening said powder charge will be ignited, said powder charge when ignited serving to eject said booster rocket case rearwardly through said ramjet duct exhaust opening to dispose of the same and also serving to cause the ignition of said main rocket propellant by blowing hot or burning material through said nozzle means, biased latch means for holding said hollow housing on said booster rocket case and said hollow portion on said main rocket case in axially fixed relationship and which latch means is normally biased into latching position, and a piston actuated means operable in response to the pressure generated by the burning of the booster propellant to move said latch means to an unlatched position to free said booster rocket for rearward movement through the ramjet duct exhaust opening, said propellant charge in said booster rocket case, said piston actuated means, and said ignition opening in said booster case being so arranged that as said booster propellant burns said piston actuated means will be operated before the combustion process reaches the region adjacent said ignition opening.

12. The combination as defined in claim 4 further characterized by means for causing the ignition of said main rocket means in response to the ignition of said powder charge.

References Cited in the file of this patent

UNITED STATES PATENTS

| | | |
|---|---|---|
| 2,644,396 | Billman | July 7, 1953 |
| 2,799,987 | Chandler | July 23, 1957 |
| 2,912,820 | Whitmore | Nov. 17, 1959 |

FOREIGN PATENTS

| | | |
|---|---|---|
| 1,109,645 | France | Sept. 28, 1955 |

UNITED STATES PATENT OFFICE
CERTIFICATE OF CORRECTION

Patent No. 3,063,240                  November 13, 1962

Walter A. Ledwith

It is hereby certified that error appears in the above numbered patent requiring correction and that the said Letters Patent should read as corrected below.

Column 5, line 12, for "generally" read -- generated --.

Signed and sealed this 23rd day of April 1963.

(SEAL)
Attest:

ERNEST W. SWIDER
Attesting Officer

DAVID L. LADD
Commissioner of Patents